United States Patent [19]

McIntyre

[11] Patent Number: 5,319,257
[45] Date of Patent: Jun. 7, 1994

[54] UNITAXIAL CONSTANT VELOCITY MICROACTUATOR

[75] Inventor: Timothy J. McIntyre, Knoxville, Tenn.

[73] Assignee: Martin Marietta Energy Systems, Inc., Oak Ridge, Tenn.

[21] Appl. No.: 912,534

[22] Filed: Jul. 13, 1992

[51] Int. Cl.⁵ .......................................... H01L 41/08
[52] U.S. Cl. ..................................................... 310/328
[58] Field of Search ............... 310/323, 328, 316, 317, 310/26; 318/116

[56] References Cited

U.S. PATENT DOCUMENTS

| | | | |
|---|---|---|---|
| 3,138,749 | 6/1964 | Stibitz | 310/328 |
| 3,902,084 | 8/1975 | May, Jr. | 310/316 |
| 3,902,085 | 8/1975 | Bizzigotti | 310/328 |
| 4,219,755 | 8/1980 | O'Neill et al. | 310/328 |
| 4,613,782 | 9/1986 | Mori et al. | 310/323 |
| 4,622,483 | 11/1986 | Staufenberg, Jr. et al. | 310/328 |
| 4,714,855 | 12/1987 | Fujimoto | 310/328 |
| 4,736,131 | 4/1988 | Fujimoto | 310/328 |
| 4,874,979 | 10/1989 | Rapp | 310/328 |
| 5,027,027 | 6/1991 | Orbach et al. | 310/317 |

*Primary Examiner*—Mark O. Budd
*Attorney, Agent, or Firm*—James M. Spicer; Harold W. Adams

[57] ABSTRACT

A uniaxial drive system or microactuator capable of operating in an ultra-high vacuum environment. The mechanism includes a flexible coupling having a bore therethrough, and two clamp/pusher assemblies mounted in axial ends of the coupling. The clamp/pusher assemblies are energized by voltage-operated piezoelectrics therewithin to operatively engage the shaft and coupling causing the shaft to move along its rotational axis through the bore. The microactuator is capable of repeatably positioning to sub-manometer accuracy while affording a scan range in excess of 5 centimeters. Moreover, the microactuator generates smooth, constant velocity motion profiles while producing a drive thrust of greater than 10 pounds. The system is remotely controlled and piezoelectrically driven, hence minimal thermal loading, vibrational excitation, or outgassing is introduced to the operating environment.

7 Claims, 7 Drawing Sheets

UNITAXIAL CONSTANT VELOCITY MICROACTUATOR

This invention was made with United States Government support under Interagency Agreement No. DE-AI05-81OR20806 between the United States Department of Energy and the National Institute of Standards and Technology. The Government has certain rights in this invention.

FIELD OF THE INVENTION

The present invention relates generally to micropositioners and mechanisms for producing uniaxial micromotion, and more particularly to a microactuator capable of moving a shaft axially in nanometer increments, and, in another mode of operation, is capable of driving the shaft smoothly at constant velocity.

BACKGROUND OF THE INVENTION

The uniaxial constant velocity microactuator (UCVM) was developed to fulfill the positioning requirements of the National Institute of Standards and Technology (NIST) Molecular Measuring Machine. The Molecular Measuring Machine is a scanning tunneling microscope based, high resolution, coordinate measuring machine. Requirements for the positioning system of the Molecular Measuring Machine are: 1) ultra-high vacuum pressure compatibility to $1 \times 10^{-8}$ Torr or less, 2) super-smooth motion profile with less than 1 nanometer of ripple, 3) very low heat generation of 1 milliwatt or less, 4) pushing force greater than 10 lbs, 5) positioning resolution less than 1 micrometer, and 6) positioning range greater than 5 centimeters. These requirements could not be fulfilled by any single commercially available microactuator, hence development work which resulted in the UCVM began at NIST and has culminated at ORNL with the demonstration of a positioning system which meets or exceeds all of the design requirements.

OBJECTS OF THE INVENTION

Accordingly, an object of the present invention is to provide a new and improved micropositioner capable of incremental positioning to one nanometer resolution while affording scan ranges on the order of one meter.

Another object of the invention is to provide a new and improved microactuator capable of smooth, non-stepping constant-velocity motion along a continuous axis.

Yet another object of this invention is to provide a microactuator that generates a pushing force in excess of 10 lbs.

Still another object is to provide a uniaxial micromotion drive system capable of operating in an ultrahigh vacuum (UHV) environment.

A further object of the invention is to provide a microactuator having no backlash (compared to lead screw driven systems).

A still further object is to provide a microactuator that produces negligible heat generation, even at high operating frequencies (compared to AC servo motor systems).

Further and other objects and advantages of the present invention will become apparent from the description contained herein.

SUMMARY OF THE INVENTION

In accordance with one aspect of the present invention, there is provided an apparatus for moving a shaft along its rotational axis comprising a flexible coupling having a bore therethrough, the bore being adapted for receiving the shaft axially; a first clamp/pusher assembly mounted in one axial end of the coupling, the first clamp/pusher assembly energized by voltage-operated piezoelectrics therewithin; and an identical second clamp/pusher assembly mounted in the other axial end of the coupling in mirror image configuration to the first clamp/pusher assembly, the second clamp/pusher assembly also energized by voltage-operated piezoelectrics therewithin; the first and second clamp/pusher assemblies operatively engaging the shaft and coupling to move the shaft along its rotational axis through the bore.

For a better understanding of the present invention, together with the advantages and capabilities thereof, reference is made to the following disclosure and appended claims in connection with the above-described drawings.

DETAILED DESCRIPTION OF THE INVENTION

Figure 1:
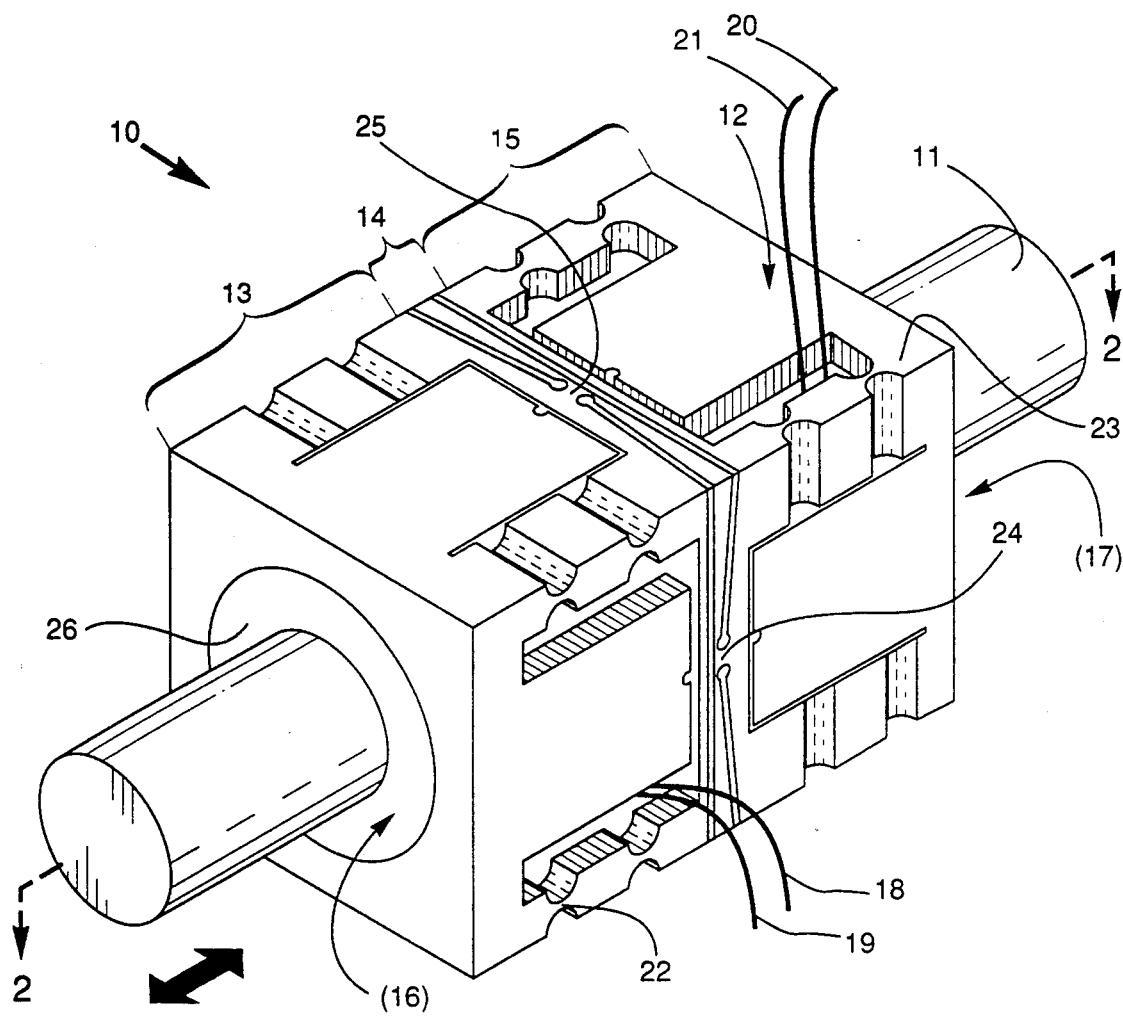
FIG. 1 is an isometric view of the microactuator of this invention.

In FIG. 1, the uniaxial constant velocity microactuator 10 of this invention is shown with an axially movable cylindrical shaft 11 therethrough. The microactuator moves the shaft 11 in nanometer increments along the direction of the shaft's rotational axis. The microactuator 10 consists of a single rectangularly-shaped housing member 12 comprising two axial end portions 13, 15, and an axial center portion 14; the portions 13-15 being arranged along the shaft 11 axis. The end portion 13 of housing 12 contains a clamp/pusher assembly 16 therewithin behind an end cap 26, and has a number of vertical lateral flexures 22 spaced about its exterior. In similar manner, end portion 15 of housing 12 contains a clamp/pusher assembly 17 therewithin behind a similar end cap 27 (shown in FIG. 2), and has a number of horizontal lateral flexures 23 spaced about its exterior. The flexures 22, 23 in end portions 13, 15 provide two orthogonal, translational degrees of motion to aid in aligning the clamp/pusher assemblies 16, 17 on the cylindrical shaft 11. The center portion 14 of housing 12 is also highly flexured through the use of a vertical lateral flexure 24 and a horizontal lateral flexure 25. The flexures 24, 25 make the housing 12 flexible in two rotational directions orthogonal to the shaft's rotational axis.

Figure 2:
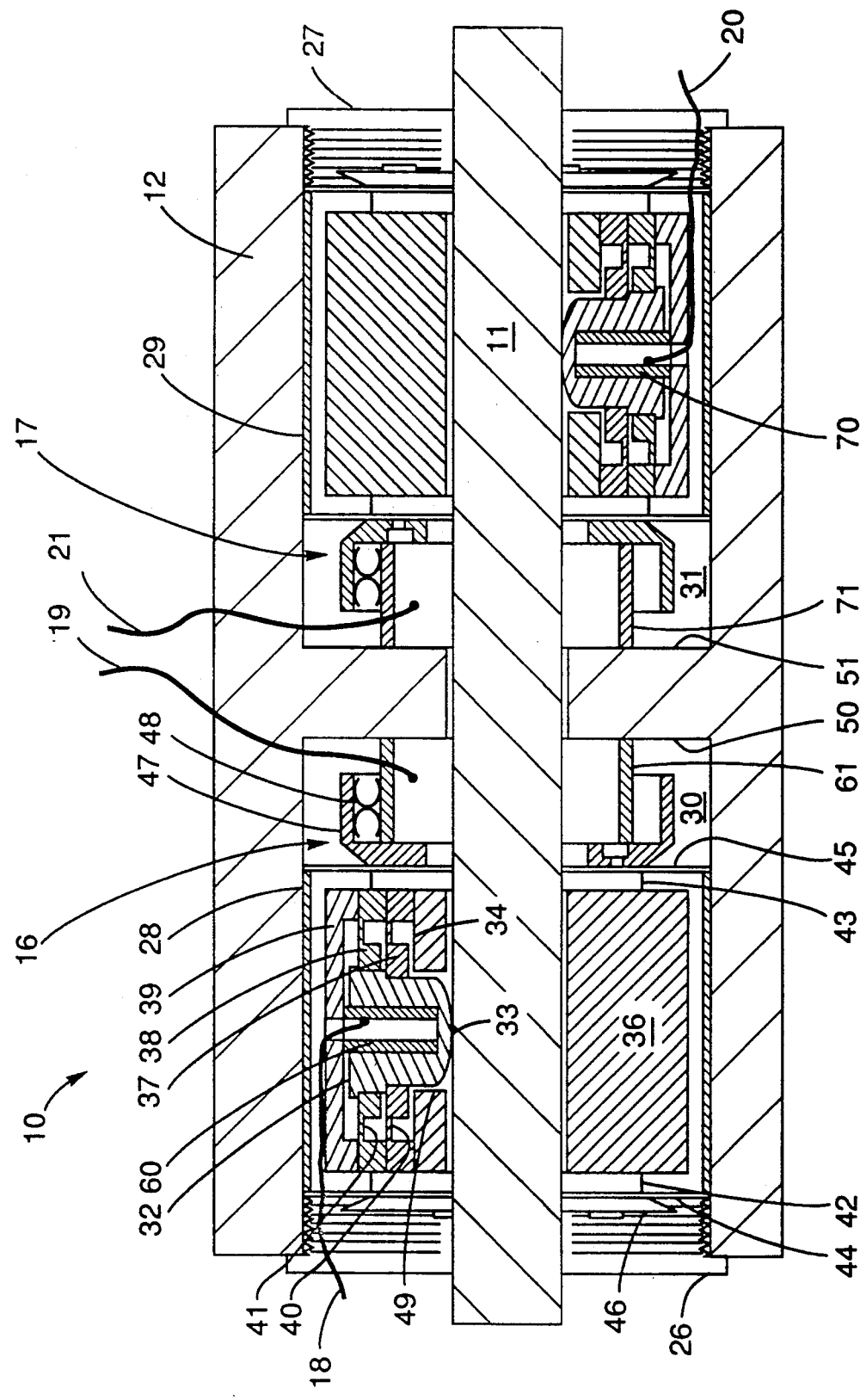
FIG. 2 is an axial cross-sectional view of the microactuator of the invention taken along the lines 2—2 in FIG. 1, and showing the placement of two identical clamp/pusher assemblies therewithin.

Now in FIGS. 1 and 2, clamp/pusher assembly 16 includes a clamper piezoelectric 60 and a pusher piezoelectric 61 (FIG. 2) that are energized through electrical leads 18, 19, respectively. Similarly, electrical leads 20, 21 are used to power a clamper piezoelectric 70 and a pusher piezoelectric 71 in the clamp/pusher assembly 17. In a typical microactuator application, only end portion 13 of housing 12 would be constrained from moving. With the housing 12 acting as a highly-flexured coupling for the clamp/pusher assemblies 16, 17, the clamp/pusher assemblies are operated in a manner that causes the shaft 11 to move in one or the other direction along its axis relative to the stationary coupling 12.

Figure 3:
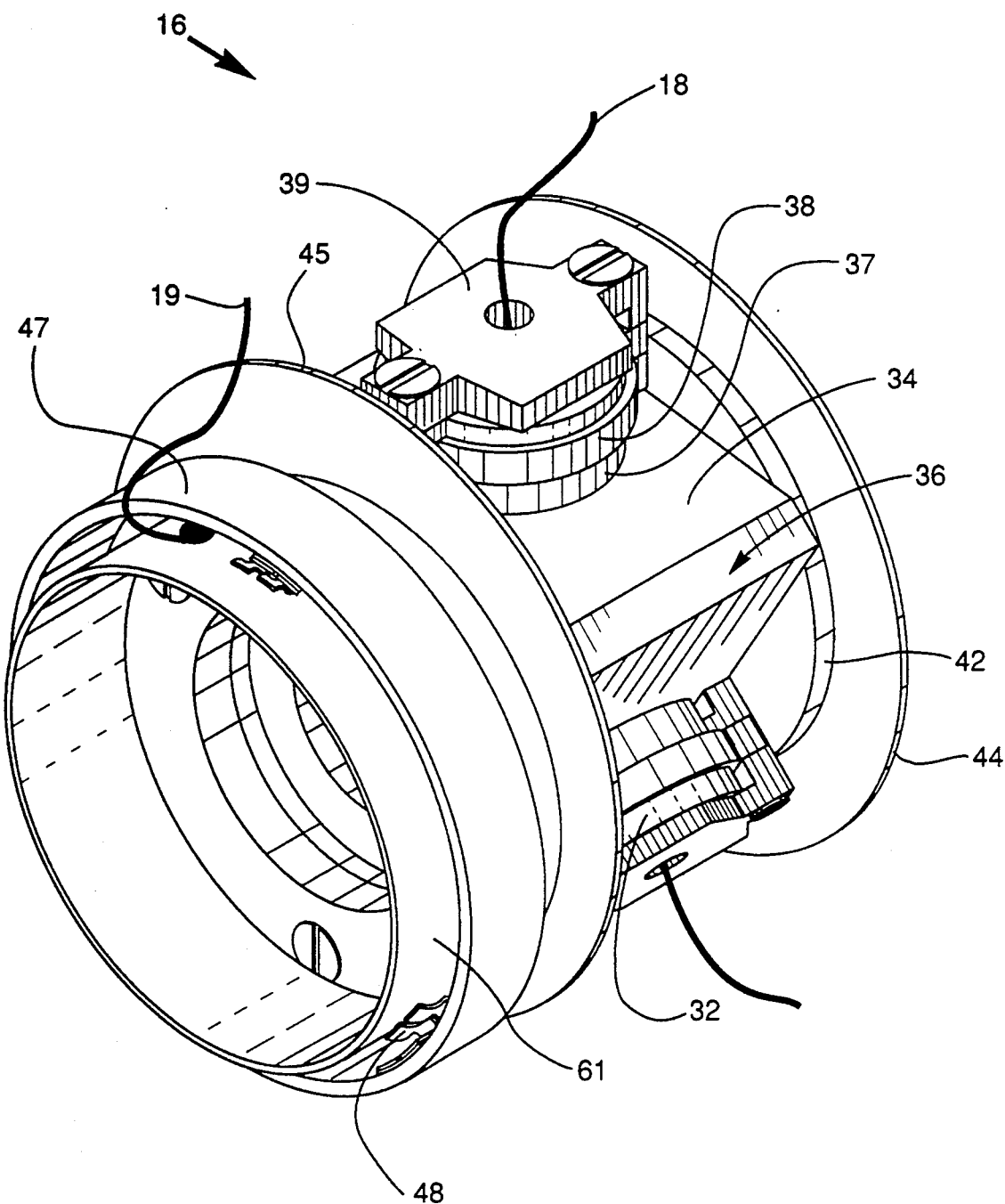
FIG. 3 is an isometric view of one of the clamp/pusher assemblies of FIG. 2.

FIGS. 2 and 3 illustrate details of the two clamp/pusher assemblies 16, 17. Assemblies 16 and 17 are identical, and are placed in mirror image configuration to each other in axial end recesses 30, 31 of the housing 12. The assembly 17 in FIG. 2 is shown inverted with respect to assembly 16, but can have any axial orientation due to the rotational and translational freedoms provided by the flexible coupling 12.

As shown in FIG. 2, the coupling 12 holds the clamp/pusher assemblies 16, 17 fixed in space only in the direction of shaft 11 motion. This highly flexured arrangement allows relative freedom of motion for each of the two clamp/pusher assemblies in the two orthogonal directions to the shaft 11 as well as roll, pitch, and yaw. These five degrees of freedom prevent the shaft 11 from jamming due to axial misalignment of the planes of contact defined by the three point contacts 33 made by each clamp assembly on the cylindrical shaft 11 (see FIG. 4). That is, clamp/pusher assemblies 16, 17 are forced to find coaxial alignment by the insertion of the shaft 11 through them; it is the flexible coupling 12 that allows this alignment to take place. Thus, the straightness of shaft 11 defines the relative orientation of the clamp/pusher assemblies 16, 17. The coupling 12 also provides internal reference surfaces 50, 51 against which pusher piezoelectrics 61, 71 mounted in assemblies 16, 17, respectively, generate the force used to drive the shaft 11 in either axial direction through the housing 12.

Figure 4:
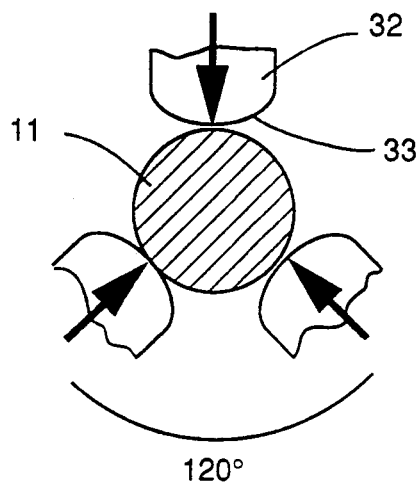
FIG. 4 is a function diagram illustrating the clamping action of clamper pads on a shaft in accordance with this invention.

Continuing in FIGS. 2, 3 and 4, three thimble-shaped clamper pads 32 are located in each clamp/pusher assembly 16, 17. The clamper pads and the assemblies that hold them are mounted on three flat surfaces of a triangularly-shaped clamper frame 36. For example, in FIGS. 2 and 3, clamper pad 32 and its assembly are shown mounted on flat surface 34 of clamper frame 36, with the clamping surface 33 of pad 32 extending radially inward through a circular hole 49 in frame 36 in order to make force contact with cylindrical shaft 11 as shown in FIG. 4. The three flat surfaces 34 of clamper frame 36 are 120° rotationally symmetric. With three clamper pads 32 contacting the cylindrical shaft 11 in a 120° co-planar orientation, the shaft 11 only makes contact with the clamper pads 32 at the three points 33 in the plane of FIG. 4. This arrangement uniformly distributes the clamping force but more importantly defines the tribological arrangement.

There are two important aspects of the clamper pad 32 design. The first is the radiused clamping surface 33 that functions as the contact point with the cylindrical shaft 11. Clamping surface 33 is machined as a section of a sphere to prevent any sharp corners of clamper pad 32 from contacting the shaft 11, as would be the case if the pad had a flat clamping surface. The radiused clamping surface 33 thus avoids scoring the shaft and prevents jamming of the shaft in the microactuator. The absence of sharp edges also allows for greater misalignment of the contact surface 33 on the shaft 11.

A second important feature of clamper pad 32 is the thimble-shape design which is achieved by machining a concentric internal cavity into the pad. The internal cavity provides space within the pad 32 for mounting the clamper piezoelectric 60. By locating the clamper piezoelectric 60 in the body of clamper pad 32, clamp/pusher assembly 16 is a much more compact design, and this significantly reduces the overall size and weight of the microactuator.

Now in FIGS. 2, 3 and 5, the clamper pad 32 and its clamper piezoelectric 60 are held in place and guided by the lower and upper clamp holders 37, 38, respectively, and the clamper lid 39. The two clamp holders 37, 38 are tightly attached to the pad 32, and serve to align and guide the motion of pad 32 radially to and from the surface of shaft 11. The guiding is accomplished with two sets of concentrically aligned flexures 40, 41 in lower and upper clamp holders 37, 38, respectively. The clamp holders 37, 38 thus provide a layered flexure design that constrains the clamper pad 32 motion to be radial to the shaft 11. Clamper lid 39 provides a reference surface from which the clamper piezoelectric 60 derives its clamping force. Clamper lid 39 also locks clamper pad 32 and the clamp holders 37, 38 to the clamper frame 36 by means of screws 52.

Figure 5A:
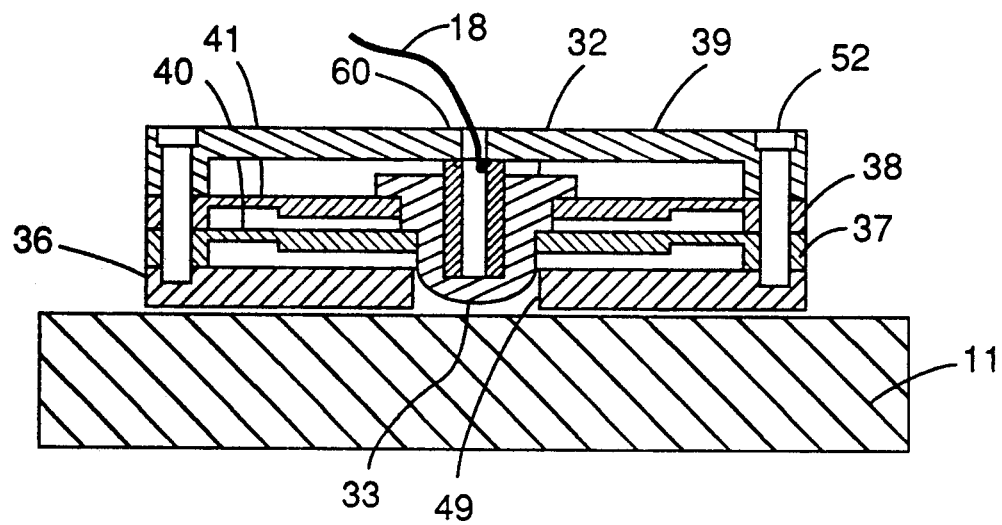
FIGS. 5a and 5b are function diagrams that further illustrate the clamping action of the clamp/pusher assemblies of FIG. 3 and clamper pads of FIG. 4.
Figure 5B:
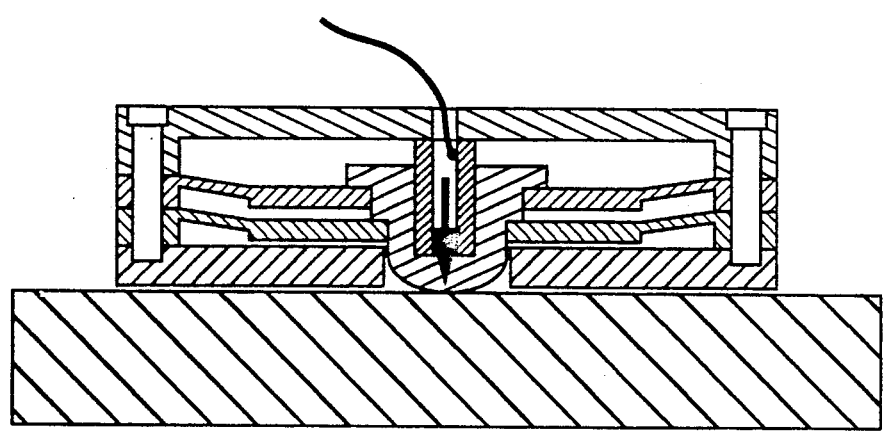

The clamping action will be understood from FIGS. 5a and 5b. As an energizing voltage is applied to the clamper piezoelectric 60 via electrical lead 18, the piezoelectric begins to extend in length. This length extension produces a force which drives the clamper pad 32 against the shaft 11. The movement of clamper pad 32 is guided normal to the surface of shaft 11 by the lower and upper clamp holders 37, 38 as previously described. The upper and lower clamp holders also act to release the clamping force upon deactivation of the clamper piezoelectric 60. This is due to the restoring force of the flexures 40, 41 in the lower and upper clamp holders 37, 38 to return them to their initial unsprung position (FIG. 5a).

Again in FIGS. 2 and 3, once a clamper pad 32, clamper piezoelectric 60, lower and upper clamp holders 37, 38, and clamper lid 39 have been assembled on a clamper frame 36, spacer rings 42, 43 are connected to both sides of the clamper frame 36. The spacer rings 42, 43 serve to stand off two large flexure rings 44, 45 from the clamper frame 36. The large flexure rings 44, 45 guide the shaft-axial motion of the clamp/pusher assembly 16 once it is fixed in place in the recess 30 in housing 12. Taking assembly 16 as an example, the outer edge of flexure ring 44 is locked in place by (is tightly abutted by) spacer cylinder 28 and end cap 26. In alternate embodiment, spacer cylinders 28 and 29 may be omitted which has the effect of reducing the pusher restoring force provided by the flexure rings 44, 45. Ibis flexing freedom provided by rings 44, 45 allows the clamp/pusher assembly 16 to move inside the recess 30 in flexible coupling 12 in a constrained way. The constraint only allows the clamp/pusher assembly 16 to move coaxially with the shaft 11, and it is through multiple repetitions of this limited motion that the shaft 11 is actually displaced. The spacer rings 42, 43 and large flexure rings 44, 45 are held to the clamper frame 36 by a locking ring 46 screwed into one side of frame 36, and a locking ring/pusher housing 47 on the other.

Continuing in FIGS. 2 and 3, in addition to locking the large flexure rings 44, 45 to the clamper frame 36, the locking ring/pusher housing 47 also holds the pusher piezoelectric 61 in place. The pusher piezoelectric 61 is press fit into housing 47 by means of a set of three sheet metal leaf springs 48. The leaf springs 48 help to axially align and fix the position of pusher piezoelectric 61 in housing 47, but do not hinder the operation of pusher piezoelectric 61 once assembled.

Figure 6:
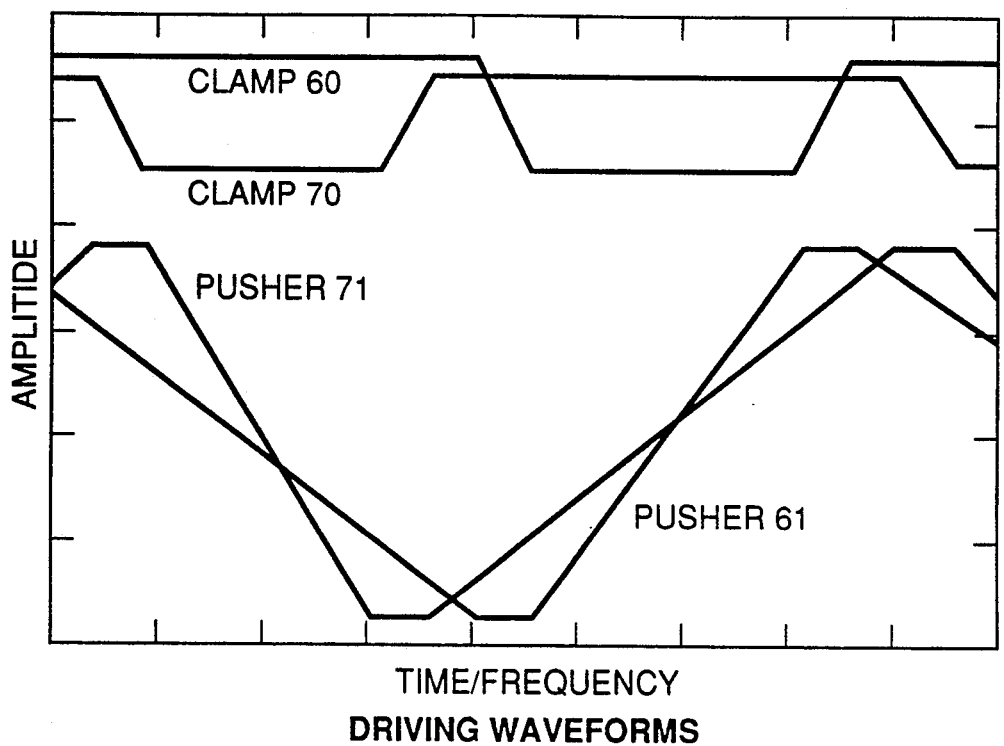
FIG. 6 is a comparison diagram showing the electrical waveforms applied to the clamping assemblies and pusher assemblies of the subject microactuator to produce the stepping or push-pull continuous drive motion of the shaft.

The microactuator can be operated to produce smooth continuous micromotion in two different modes; push-pull type motion and compound type motion. FIGS. 2 and 6 illustrate the push-pull sequence of motion generation. The push-pull sequence is achieved by transmitting a series of voltages in the form of trapezoidal waveforms (FIG. 6) to the clamper piezoelectrics 60, 70 and pusher piezoelectrics 61, 71. In the pushing sequence, clamper piezoelectric 70 is active (clamped) while both pusher piezoelectrics 61, 71 are extending. Since clamper piezoelectric 60 is inactive, the motion of pusher piezoelectric 61 does nothing but drag the unclamped clamper piezoelectric 60 on the shaft 11. A clamp and pusher reversal takes place upon initiation of the pulling sequence. In the pulling sequence, the clamper piezoelectric 60 in clamp/pusher assembly 16 is active while pusher piezoelectric 61 is contracting (the result is actually a pull not a push; it would be a push if the shaft 11 were moving in the opposite direction). During the motion sequence there is a clamp/pusher transitional period. During this period, a precise overlap of push and pull sequences is required to assure smooth drive motion. Motion is achieved by optimizing the phase relationship and the clamp/pusher voltage waveforms for each individual clamp/pusher assembly.

Figure 8:
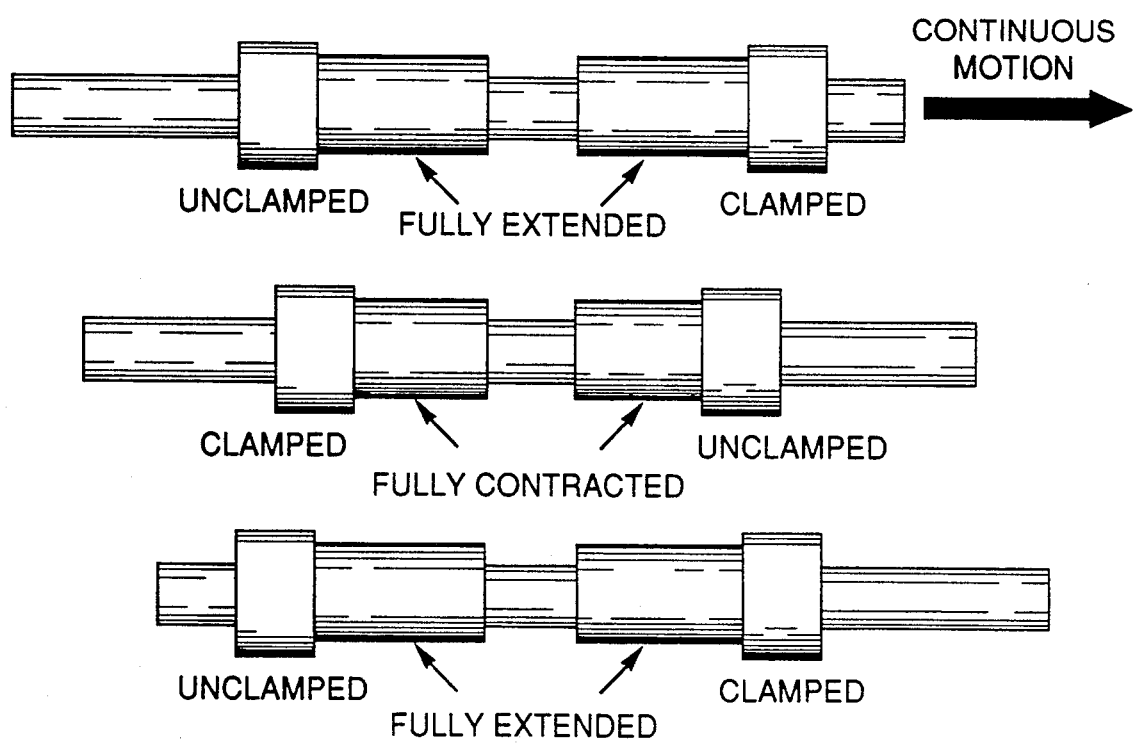
FIG. 8 is a function diagram illustrating the successive clamping and pushing motions of the subject invention in operation.

The pushing action is explained with the aid of FIG. 8. When the clamp assembly is active, the pusher piezoelectric 61 extends to generate the drive force. The drive force results from the pusher extension against a reference surface 50 which is built into the housing 12. The pushing force actually translates the whole clamp/pusher assembly, bringing the shaft 11 along. Upon clamper release, the restoring force of the large flexure ring(s) translates the clamp/pusher assembly back to its original position. The sequence is repeated for continuous motion.

Figure 7:
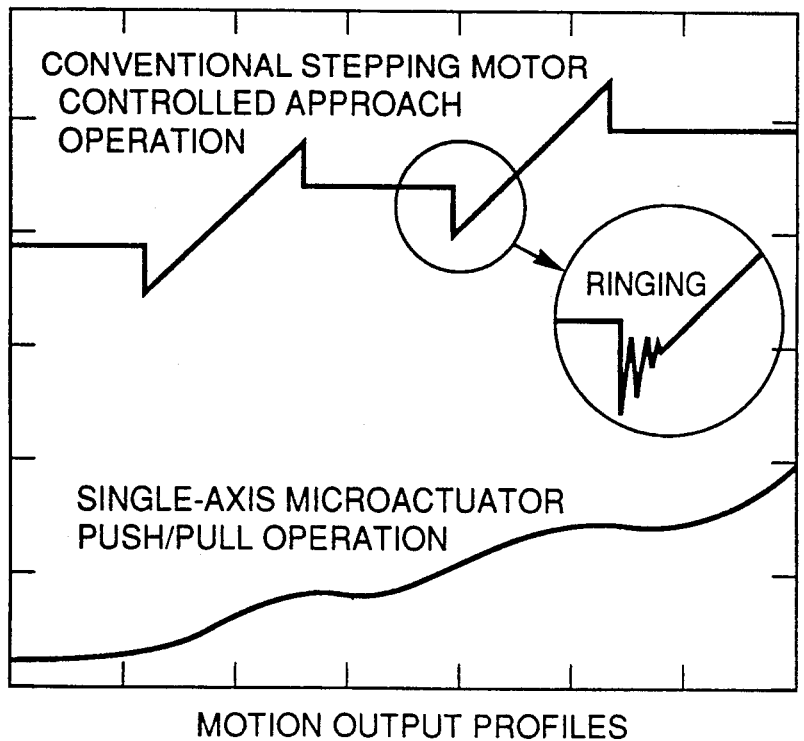
FIG. 7 is a graph comparing the continuous motion provided by a conventional stepping motor with the continuous motion of the microactuator of the subject invention.

FIG. 7 compares a typical output profile for the commercially available Burleigh Inchworm stepper motor with the microactuator of this invention. Notice in the upper curve in FIG. 7 the transients that are superimposed on the stepper motor motion. These undesirable transients are generated by the abrupt clamping input wave sequence and the internal design of the motor, and result in a resonation of the driven shaft. The microactuator produces the vanishingly smooth, continuous (constant velocity, nonstepping) motion shown in the lower diagram of FIG. 7.

Figure 9:
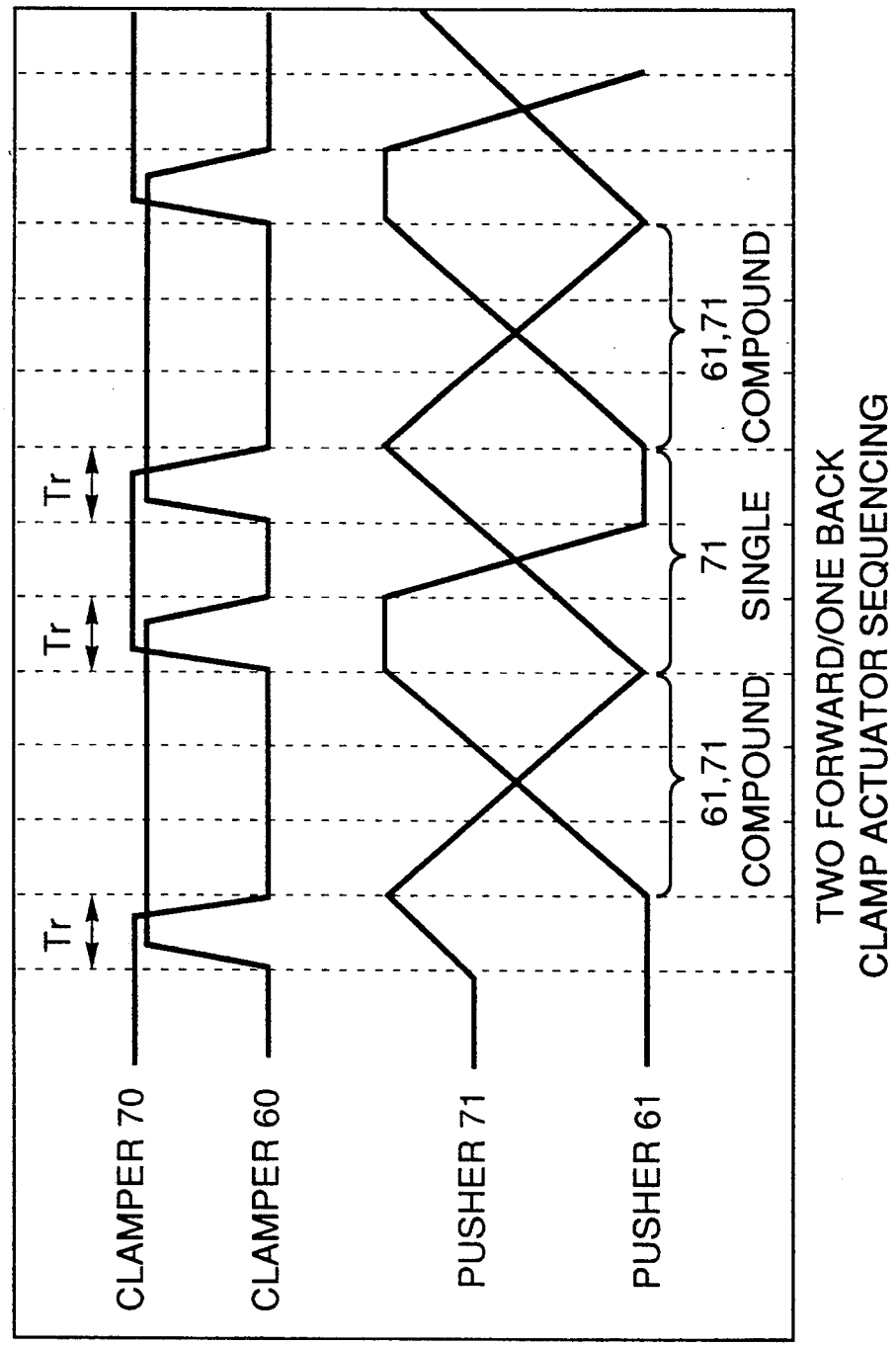
FIG. 9 is a comparison diagram showing alternative electrical waveforms applied to the clamping assemblies and pusher assemblies of the subject microactuator to produce the compound type continuous drive motion of the shaft.

The method of compound type motion mentioned above is now described. FIG. 9 shows the sequencing of the clamper piezoelectrics 60, 70 and pusher piezoelectrics 61, 71 to produce this mode of operation. When clamper piezoelectric 70 is clamped, pusher piezoelectric 71 extends to the right, producing microactuator motion to the right. Simultaneously, pusher piezoelectric 61 contracts. The next step has clamper piezoelectric 60 activated while pusher piezoelectric 61 expands and pusher piezoelectric 71 contracts simultaneously. The expansion magnitude of pusher piezoelectric 61 is twice as large as the contraction magnitude of pusher piezoelectric 71, therefore the velocity of the compound motion of pusher piezoelectrics 61 and 71 is exactly equal to the velocity of pusher piezoelectric 71 in the previous step. Hence, a constant velocity is maintained. Still with reference to FIG. 9, there are two periods in each motion's cycle; one is single motion, and the other is compound motion. The clamper piezoelectrics have a transition period $T_r$ which coincides with the pusher piezoelectric 71 single motion to keep the drive shaft translation stable.

It will be apparent to those skilled in the art of micropositioning that the clamp/pusher assemblies 16, 17 may be arranged within housing 12 in consecutive fashion (aligned axially in the same direction) rather than in mirror image configuration to each other. In this embodiment, an additional spacer cylinder in the manner of spacer cylinders 28, 29 would be needed at the locking ring end rather than at the end cap end.

The uniaxial constant velocity microactuator was developed to provide ultra-precise scanning and indexing in a remote environment. Highly accurate, repeatable positioning in the sub-manometer regime is a necessity when performing dimensional metrology at the current state-of-the-art. The microactuator is ideally suited for positioning or scanning a myriad of atomic resolution microscopes as well as many other sensors or transducers. Applications in both the measurement and fabrication fields as well as the actuating and positioning capability of the microactuator truly make it a versatile device.

When performing ultra-precise measurement or fabrication there are many factors which may impact the quality of the end product. Hence, measurements or fabrication processes are often carried out in a thermally controlled, vacuum environment. Airborne acoustic perturbations can also contribute to the mechanical stability of the working environment. Finally, structural vibration isolation is required to achieve sub-manometer system accuracy.

When addressing the thermal, vibrational, and cleanliness issues one usually thinks of eliminating outside influences to the working environment. There are many techniques for minimizing each of these effects. However, systems which include positioning, sensing, or various forms of processing often introduce one or more of the very perturbations you are trying to control from inside the working environment. The microactuator is designed with this very problem in mind.

Since the microactuator is a piezoelectrically driven positioner, the thermal load imparted to the system is almost negligible unless operated at very high speeds. The radiant power imparted to the working environment is less than 10 milliwatts for maximum scanning speed; for normal operation the heat generated is 1 milliwatt or less.

The vibrational component may be assessed as follows. The most critical aspects of internally generated mechanical disturbances are the clamp/pusher input profiles, the clamp/pusher action frequency, and the coupling efficiencies of the vibrational inertia from the clamp/pusher assemblies to the shaft 11 and the shaft 11 to the actuated system. In order to eliminate clamp impulse generated vibration, either parabolic input waveforms or trapezoidal waveforms with the appropriate phase relationship may be used. Trapezoidal inputs were chosen to reduce clamper response time to full amplitude. The input signal profile phase between clamp/pusher assemblies may turn out to be the most significant vibration mechanism. The clamp/pusher action frequency will only impact system stability if the motion output is not smooth. Motion smoothness is controlled directly by the input signal phase relationship. The only caveat here would be operating the microactuator at a frequency which couples to a resonance elsewhere in the system, hence multiplying any vibrational amplitude which passes the input signal conditioning. Since the clamp/pusher assemblies are rigidly coupled to the shaft 11 at all times, all vibration not addressed via input signal phase will be efficiently passed. The shaft 11 must also be rigidly coupled to the actuated system in order to realize the positioning accuracy provided by the microactuator. Therefore, it is critical the microactuator-generated vibration problem be handled at the signal input end.

The cleanliness should only be affected by system tribology since the piezoelectric motion is ultra-high vacuum compatible. The tribological system does not involve a lubricant in the conventional sense and therefore is scrupulously clean. In the prototype, shaft 11 is superinvar, for example, for its very low thermal coefficient of expansion. Aluminum oxide clamper pads 32 on a superinvar shaft 11 act as a very clean solid bearing system. The hard ceramic-soft metal pair acts as a sliding lubricant to reduce dynamic friction while static friction is not substantially reduced. The reduction of dynamic friction results from the transfer of superinvar metal to the bearing pad and back. This process initially requires the pad-shaft interface be broken in. The net result is lubricated clamper pads 32 with a negligible amount of metallic scrub-off. The other materials of construction may include aluminum, stainless steel and piezoelectric ceramic. The piezoelectric material may be lead zirconate titanate, for example.

While there has been shown and described what are at present considered the preferred embodiments of the invention, it will be obvious to those skilled in the art that various changes and modifications can be made therein without departing from the scope of the inventions defined by the appended claims.

We claim:

1. An apparatus for moving a shaft along its rotational axis comprising:
    a flexible coupling having a bore therethrough, said bore adapted for receiving said shaft axially;
    a first clamp/pusher assembly mounted in one axial end of said coupling, said first clamp/pusher assembly energized by voltage-operated piezoelectrics therewithin; and
    an identical second clamp/pusher assembly mounted in the other axial end of said coupling in axial mirror image configuration to said first clamp/pusher assembly, said second clamp/pusher assembly also energized by voltage-operated piezoelectrics therewithin;
    said first and second clamp/pusher assemblies operatively engaging said shaft and said coupling to move said shaft along its rotational axis through said bore.

2. An apparatus according to claim 1 wherein said shaft and said bore are cylindrical.

3. An apparatus according to claim 1 wherein said piezoelectrics of said first clamp/pusher assembly include a plurality of piezoelectrics arranged for causing clamper pads within said first clamp/pusher assembly to radially engage said shaft as a clamp, and also a single piezoelectric arranged for directly engaging said coupling as a pusher.

4. An apparatus according to claim 3 wherein said piezoelectrics of said second clamp/pusher assembly include a plurality of piezoelectrics arranged for causing clamper pads within said second clamp/pusher assembly to radially engage said shaft as a clamp, and also a single piezoelectric arranged for directly engaging said coupling as a pusher.

5. An apparatus according to claim 4 wherein said voltage applied to said piezoelectrics are trapezoidal waveforms resulting in a smooth continuous push-pull type motion of said shaft through said coupling.

6. An apparatus according to claim 4 wherein said voltage applied to said piezoelectrics are trapezoidal waveforms resulting in a smooth continuous compound type motion of said shaft through said coupling.

7. An apparatus for moving a shaft along its rotational axis comprising:
    a flexible coupling having a bore therethrough, said bore adapted for receiving said shaft axially;
    a first clamp/pusher assembly mounted in one axial end of said coupling, said first clamp/pusher assembly energized by voltage-operated piezoelectrics therewithin; and
    an identical second clamp/pusher assembly mounted in the other axial end of said coupling in identical axial alignment as said first clamp/pusher assembly, said second clamp/pusher assembly also energized by voltage-operated piezoelectrics therewithin;
    said first and second clamp/pusher assemblies operatively engaging said shaft and said coupling to move said shaft along its rotational axis through said bore.

* * * * *